US010078129B2

(12) United States Patent
Sugino (10) Patent No.: US 10,078,129 B2
(45) Date of Patent: Sep. 18, 2018

(54) SIGNAL PROCESSING DEVICE (71) Applicant: Panasonic Intellectual Property Management Co., Ltd., Osaka (JP)

(72) Inventor: Satoshi Sugino, Osaka (JP)

(73) Assignee: Panasonic Intellectual Property Management Co., Ltd., Chuo-Ku, Osaka-Shi, Osaka (JP)

( * ) Notice: Subject to any disclaimer, the term of this patent is extended or adjusted under 35 U.S.C. 154(b) by 383 days.

(21) Appl. No.: 14/653,458

(22) PCT Filed: Dec. 3, 2013

(86) PCT No.: PCT/JP2013/007102
§ 371 (c)(1),
(2) Date: Jun. 18, 2015

(87) PCT Pub. No.: WO2014/103187
PCT Pub. Date: Jul. 3, 2014

(65) Prior Publication Data
US 2016/0195606 A1 Jul. 7, 2016

(30) Foreign Application Priority Data
Dec. 28, 2012 (JP) .................................. 2012-288366

(51) Int. Cl.
*G01S 7/02* (2006.01)
*G01S 7/35* (2006.01)
*G01S 13/56* (2006.01)

(52) U.S. Cl.
CPC .............. *G01S 7/023* (2013.01); *G01S 7/354* (2013.01); *G01S 13/56* (2013.01); *G01S 2007/356* (2013.01)

(58) Field of Classification Search
CPC .......... G01S 7/023; G01S 7/354; G01S 13/56; G01S 2007/356

(Continued)

(56) References Cited

U.S. PATENT DOCUMENTS 9,229,102 B1 * 1/2016 Wright .................. G01S 13/888
2013/0009555 A1   1/2013 Murakami et al.
2015/0130652 A1   5/2015 Sugino et al.

FOREIGN PATENT DOCUMENTS

JP     S62-043580 A    2/1987
JP     H1-280273 A    11/1989
(Continued)

OTHER PUBLICATIONS

Narayan et al., "Transform Domain LMS Algorithm", IEEE Transactions on Acoustics, Speech, and Signal Processing, vol. ASSP-31, No. 3, Jun. 1983.*

(Continued)

*Primary Examiner* — Frank J McGue
(74) *Attorney, Agent, or Firm* — Renner, Otto, Boisselle & Sklar, LLP (57) ABSTRACT

A signal processing device (2) includes an amplifier (3), an A/D converter (4) and a signal processor (5). The amplifier (3) amplifies a sensor signal that is supplied from a radio wave sensor (1) and depends on a motion of an object. The A/D converter (4) converts the sensor signal amplified by the amplifier (3) into a digital sensor signal. The signal processor (5) converts the sensor signal output from the A/D converter (4) into a frequency-domain sensor signal by Discrete Cosine Transform processing, estimates a background signal contained in the frequency-domain sensor signal, based on an error signal obtained from the sensor signal and a reference signal which is white noise, and determines a filter coefficient according to the estimated background signal, thereby operating as an adaptive filter for removing the background signal from the sensor signal in the frequency domain.

13 Claims, 8 Drawing Sheets

(58) Field of Classification Search
USPC .......................................................... 342/195
See application file for complete search history.

(56) References Cited

FOREIGN PATENT DOCUMENTS

| JP | H4-335177 | A | 11/1992 |
| JP | H11-038127 | A | 2/1999 |
| JP | 2001-004736 | A | 1/2001 |
| JP | 2004-293216 | A | 10/2004 |
| JP | 2004-317240 | A | 11/2004 |
| JP | 2010-191857 | A | 9/2010 |
| JP | 2011-47779 | A | 3/2011 |
| JP | 2011-147500 | A | 8/2011 |
| JP | 2011-242343 | A | 12/2011 |
| WO | WO 2011/075639 | A1 | 6/2011 |
| WO | WO 2013/183271 | A1 | 12/2013 |

OTHER PUBLICATIONS

Extended European Search Report for corresponding European Application No. 13867767.9 dated Dec. 14, 2015.
Oruklu et al, "Hardware-efficient realization of a real-time ultrasonic target detection system using 1/R filters", IEEE Transactions on Ultrasonics, Ferroelectrics and Frequency Control, IEEE, US, vol. 56, No. 6, Jun. 1, 2009, pp. 1262-1269, ISSN: 0885-3010, DOI: 10.1109/TUFFC.2009.1168.
International Search Report for corresponding International Application No. PCT/2013/007102 dated Jan. 21, 2014.
Form PCT/ISA/237 for corresponding International Application No. PCT/2013/007102 dated Jan. 21, 2014.
Toshio Okuda and Tetsushi Ikegami, "A Study for Doppler Frequency Offset Compensation Method in Small Satellite", Proceedings of the 2006 IEICE Communication Society Conference, Sep. 7, 2006, p. 274, ISSN 1349-1415, and partial English translation.

\* cited by examiner

SIGNAL PROCESSING DEVICE

TECHNICAL FIELD

The invention relates to a signal processing device configured to process sensor signals from a sensor that receives a wireless signal reflected by an object.

BACKGROUND ART

Figure 12:
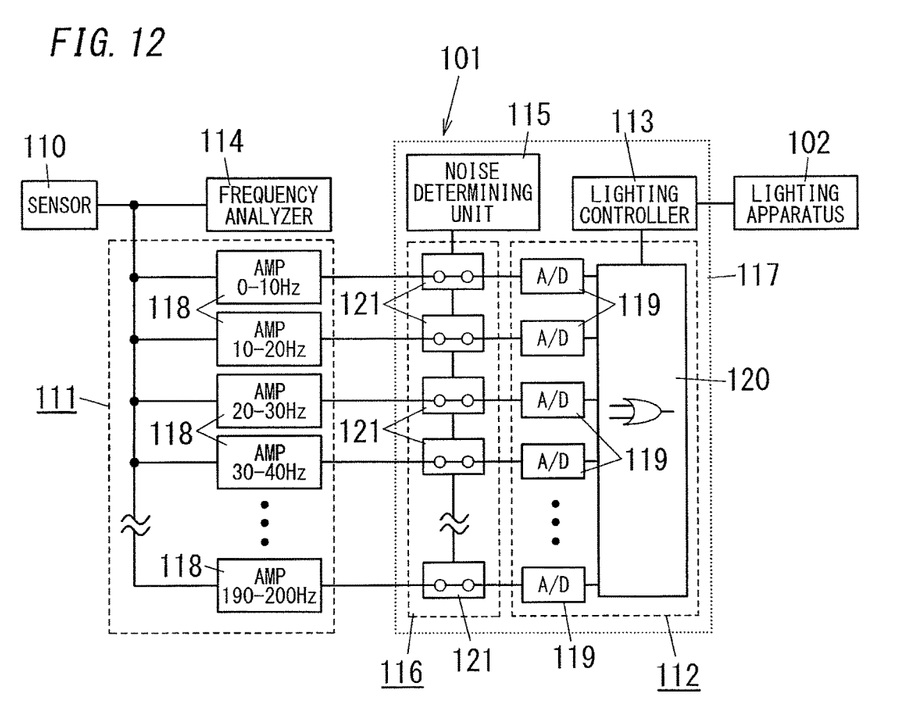
FIG. 12 is a block diagram of a conventional illuminating system.

There has been proposed a lighting system having a configuration shown in FIG. 12 (for example, see JP2011-47779A; hereinafter referred to as "Document 1"). This lighting system includes: an object detection device 101 provided with a sensor 110 that detects the presence or absence of a detection target object in a detection area and outputs a sensor signal; and a lighting apparatus 102. The object detection device 101 controls a lighting state of the lighting apparatus 102.

The sensor 110 is a millimeter-wave sensor that transmits a millimeter wave to the detection area, receives a millimeter wave reflected by the detection target object moving in the detection area, and outputs a sensor signal having a Doppler frequency which is equivalent to a frequency difference between the transmitted millimeter wave and the received millimeter wave.

The object detection device 101 includes an amplifying circuit 111, a determining unit 112 and a lighting controller 113. The amplifying circuit 111 is configured to divide the sensor signal outputted from the sensor 110 into components according to a plurality of frequency bandwidths and to perform amplification for each of the plurality of frequency bandwidths. The determining unit 112 determines the presence or absence of the detection target object by comparing outputs of the amplifying circuit 111 with a predetermined threshold value(s). The lighting controller 113 controls a lighting state of the light apparatus 102 according to a determination result by the determining unit 112.

The object detection device 101 includes a frequency analyzer 114 and a noise rejection unit (a noise determining unit 115 and a switching circuit 116). The frequency analyzer 114 detects intensity for each frequency of the sensor signal outputted from the sensor 110. By using an analysis result by the frequency analyzer 114, the noise rejection unit reduces the influence of a noise having a particular frequency, produced constantly. A FFT (Fast Fourier Transform) analyzer is used as the frequency analyzer 114. The determining unit 112, the lighting controller 113 and the noise rejection unit are contained in a control block 117 mainly including a microcomputer. The amplifying circuit 111 constitutes a signal processor outputting the sensor signal component divided according to the predetermined frequency bandwidths. Document 1 also mentions that the signal processor may be constituted by an FFT analyzer or a digital filter.

The amplifying circuit 111 has a plurality of amplifiers 118, and an operational amplifier is used as each amplifier 118. In each amplifier 118, a frequency bandwidth of a signal component to be amplified can be set by an adjustment of various parameters of a circuit constituting the amplifier 118. That is, each amplifier 118 also functions as a band-pass filter permitting the passage of a signal component of a particular frequency bandwidth. Then, in the amplifying circuit 111, the plurality of amplifiers 118 are connected in parallel, and amplify the sensor signal components divided according to the plurality of frequency bandwidths. Then, the amplifiers 118 output divided and amplified signal components having the respective individual frequency bandwidth.

The determining unit 112 includes a comparator (abbreviated to "A/D" in FIG. 12) 119 for each amplifier 118. Each comparator 119 A/D-converts an output of a corresponding amplifier 118 into a digital value, and then compares the digital value with a predetermined threshold value, and thereby the determining unit 112 determines the presence or absence of the detection target object. In addition, individual threshold values are set for pass-bands (that is, for amplifiers 118) one each and each comparator 119 outputs a high-level signal when the output of the corresponding amplifier 118 is outside the scope of the threshold value. In this conventional example, a threshold value "Vth" of each pass-band in an initial state (before shipment) is a value represented by Vth=Vavg±Vppini, where the "Vppini" means a maximum of peak to peak "Vpp" in outputs "V" of each amplifier 118 detected within a given period of time, in a state where there is no electromagnetic wave reflection in an anechoic chamber, and the "Vavg" means the average value of said outputs "V". The determining unit 112 includes an OR circuit 120, which obtains a logical add of comparison results from the comparators 119. If there is even one high-level signal, the OR circuit 120 outputs a sensing signal showing "sensed condition" which means the presence of the detection target object. In contrast, if all signals are low-level, the OR circuit 120 outputs a sensing signal showing "non-sensed condition" which means the absence of the detection target object. The sensing signal shows "1" in the sensed condition, and shows "0" in the non-sensed condition.

The noise rejection unit includes the noise determining unit 115 which determines, from the output of the frequency analyzer 114, the presence or absence of a noise having a particular frequency, produced constantly, and the switching circuit 116 which switches output states of amplifiers 118, to be output to the determining unit 112 according to a determination result of the noise determining unit 115.

The switching circuit 116 includes a plurality of switches 121, and each switch 121 is inserted between an amplifier 118 of the amplifying circuit 111 and a corresponding comparator 119 of the determining unit 112. All of the switches 121 are turned on in the initial state, and then on/off states of the switches 121 are individually controlled through an output of the noise determining unit 115, and thereby outputs from the amplifiers 118 to the determining unit 121 are individually turned on or off. That is, the switching circuit 116 turns off a switch 121 corresponding to an amplifier 118 having an arbitrary pass-band of pass-bands according to an output of the noise determining unit 115, and thereby an output of the amplifier 118 can be invalidated.

The noise determining unit 115 reads signal intensity (voltage intensity) of each frequency (frequency component) of the sensor signal which is outputted from the frequency analyzer 114, and stores respective signal intensity in a memory (not shown), and then determines, by using the stored data, the presence or absence of a noise having a particular frequency, produced constantly.

When the noise determining unit 115 determines that a noise having a particular frequency is produced constantly, the noise determining unit 115 controls the switching circuit 116 to turn off a switch 121 inserted between the determining unit 112 and an amplifier 118 having a pass-band containing the frequency of the noise. Thus, when the noise having the particular frequency is produced constantly, an output of the amplifying circuit 111 to the determining unit 112, corresponding to a frequency bandwidth containing the noise, is invalidated. In the conventional example, on/off state of each switch 121 is updated whenever the noise determining unit 115 determines that the surrounding environment is in "steady state".

In a signal processing device for detecting movement of an object by processing sensor signals, Fast Fourier Transform (FFT) is used in general when removing a background signal such as unknown noise or undesired signal (a periodic signal that is present in the environment and is not derived from the movement of a detection target object) by adaptive signal processing in frequency domain.

In a case of converting, using FFT, a time-domain digital signal of which sampling period is "t" and of which sample number is "2N" into a frequency-domain signal so that the signal is useful for subsequent signal processing in view of aliasing characteristics after FFT processing, under a condition that the maximum frequency of a frequency range is "1/(2t) [Hz]", the frequency resolution be "1/(2 Nt) [Hz]" and the number of valid samples be "N". Further, a window function is applied before applying FFT. Therefore, an adaptive filter using FFT requires a memory having at least "2N" words, in order to apply only FFT other than adaptive processing. Further, because of requiring performing complex number calculation, this adaptive filter requires a comparatively large-scale hardware. Furthermore, the subsequent adaptive-processing and filtering processing requires performing complex number calculation, which causes larger load on the hardware.

Therefore, if the frequency-domain adaptive filter using FFT is applied to a signal processing device that processes a sensor signal, problems are raised that the load on the hardware and the cost thereof would increase. These problems of increasing load on the hardware and increasing cost has been one obstacle for the application of the filter to a commercial sensor device which typically requires a lowered cost.

DISCLOSURE OF INVENTION

The invention is achieved in view of the above circumstances, and an object thereof is to provide a signal processing device capable of efficiently removing the background signal to obtain the desired signal with a comparatively simple hardware configuration achieved by a lower cost.

A signal processing device (2) of the invention includes an amplifier (3), an A/D converter (4) and a signal processor (5). The amplifier (3) is configured to amplify a (first-form) sensor signal (Sa) supplied from a sensor (1) that is configured to receive a wireless signal reflected by an object. The A/D converter (4) is configured to convert the (second-form) sensor signal (Sb) amplified by the amplifier (3) into a (third-form) digital sensor signal (Sc) and to output the digital sensor signal (Sc). The signal processor (5) is configured to convert the sensor signal (Sc) output from the A/D converter (4) into a (fourth-form) frequency-domain sensor signal (Sx) by Discrete Cosine Transform processing, to estimate a background signal contained in the frequency-domain sensor signal (Sx) based on an error signal (Se) obtained from the sensor signal (Sx) and a reference signal (Sd) which is white noise, and to determine a filter coefficient (Wo) according to the estimated background signal, thereby operating as an adaptive filter for removing the background signal from the sensor signal (Sx) in the frequency domain.

In one embodiment, the signal processor (5) has first and second modes which are selectively switchable. In the first mode, the signal processor (5) estimates the background signal contained in the sensor signal (Sx) based on the error signal (Se), and updates the filter coefficient (Wo) according to the estimated background signal. In the second mode, the signal processor (5) stops the updating processing of the filter coefficient (Wo), and removes the background signal from the sensor signal (Sx) in the frequency domain.

In one embodiment, the signal processor (5) is configured, when determining that the error signal (Se) has converged while operating in the first mode, to switch from the first mode to the second mode.

In one embodiment, the signal processor (5) is configured, when determining that the error signal (Se) has converged within a predetermined range while operating in the first mode, to produce filter coefficients (Wo) based on respective error signals (Se) which are each within the predetermined range and are obtained at different time points, to calculate an average of the produced filter coefficients, and to set the calculated average to the filter coefficient (Wo).

In one embodiment, the signal processor (5) is configured, in the second mode, to convert the sensor signal (Sc) output from the A/D converter (4) into the frequency-domain sensor signal (Sx) by the Discrete Cosine Transform processing, to remove the background signal from the sensor signal (Sx) in the frequency domain to extract therefrom signal components with respect to frequency bins (fb) which have mutually different frequency bandwidths, and to perform recognition processing of identifying the object based on the signal components of the respective frequency bins (fb).

In one embodiment, the signal processor (5) is configured, in the second mode, to convert the sensor signal (Sc) output from the A/D converter (4) into the frequency-domain sensor signal (Sx) by the Discrete Cosine Transform processing, to remove the background signal from the sensor signal (Sx) in the frequency-domain to extract therefrom signal components with respect to sub-bands (fs) each of which includes frequency bins (fb) that have mutually different frequency bandwidths, and to perform recognition processing of identifying the object based on the signal components of the respective sub-bands (fb).

In one embodiment, the signal processor (5) has a filter coefficient (Won; where "n" is any of the numeral "1" to "N" and "N" is the total number of frequency bins fb) for each of the frequency bins (fb). The signal processor (5) is configured to apply Inverse Discrete Cosine Transform processing to all of the filter coefficients (Won) or predetermined part of the filter coefficients (Won) to obtain inversion values, to produce time-domain data from the sensor signal (Sc) output from the A/D converter (4) and the obtained inversion values, and to perform the recognition processing of identifying the object based on the produced time-domain data.

In one embodiment, the signal processor (5) is configured to apply Inverse Discrete Cosine Transform processing to the signal components of the respective sub-bands (fs) to obtain inversion values, to produce time-domain data from the obtained inversion values, and to perform the recognition processing of identifying the object based on the produced time-domain data.

In one embodiment, the signal processor (5) is configured to further use distance information from the sensor (1) to the object, when performing the recognition processing of identifying the object.

In one embodiment, the signal processor (5) is configured: if the object is identified by the recognition processing, to be forbidden to switch from the second mode to the first mode;

and if the object is not identified by the recognition processing, to be allowed to switch from the second mode to the first mode.

In one embodiment, an adaptive algorithm for the adaptive filter is an LMS algorithm of the Discrete Cosine Transform.

In one embodiment, the signal processor (5) includes a DCT converter (50), a filtering unit (51) and an identification processor (52). The DCT converter (50) is configured to convert the sensor signal (Sc) output from the A/D converter (4) into the frequency-domain sensor signal (Sx) by the Discrete Cosine Transform processing. The filtering unit (51) is configured to adaptively-estimate the background signal based on the frequency-domain sensor signal (Sx) from the DCT converter (50) and the reference signal (Sd), and to remove the background signal from the frequency-domain sensor signal (Sx) from the DCT converter (50). The identification processor (52) is configured to identify the object based on an output signal (Sy) from the filter unit (51).

In one embodiment, the filtering unit (51) includes a filter (5a), a subtracter (5b) and an adaptive processor (5c). The filter (5a) is configured to remove the background signal from the sensor signal (Sx) in the frequency domain based on the variable filter coefficient (Wo) to produce the output signal (Sy). The subtracter (5b) is configured to calculate difference between the output signal (Sy) from the filter (5a) and the reference signal (Sd) to obtain the error signal (Se). The adaptive processor (5c) is configured to estimate the background signal based on the error signal (Se), and to update the filter coefficient (Wo) according to the estimated background signal.

The signal processing device of the invention includes the signal processor operating as the frequency-domain adaptive filter configured to remove the background signal from the sensor signal based on the Discrete Cosine Transform processing. Accordingly, it is possible to efficiently remove the background signal to obtain the desired signal with a simple hardware configuration achieved by a lower cost.

DESCRIPTION OF EMBODIMENTS

Hereafter, a signal processing device 2 in the present embodiment will be described with reference to FIGS. 1 to 11.

Figure 1:
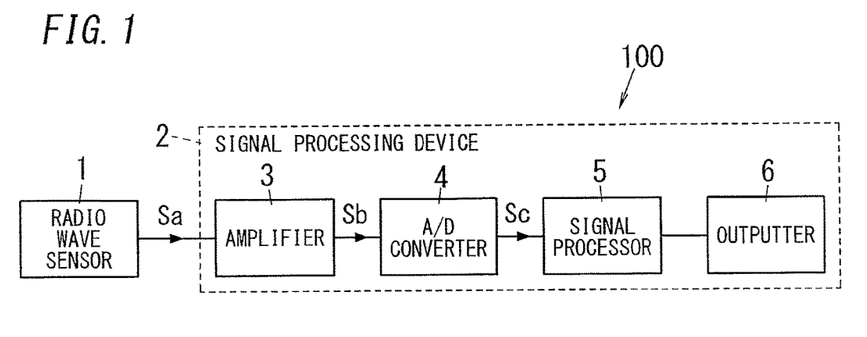
FIG. 1 is a block diagram of a sensor device including a radio wave sensor and a signal processing device in an embodiment.

The signal processing device 2 is configured to process a sensor signal Sa output from a radio wave sensor 1. The radio wave sensor 1 is configured to transmit a radio wave in a detection area, to receive a radio wave reflected by an object in the detection area, and to output a sensor signal Sa which reflects the movement of the object. FIG. 1 is a block diagram of a sensor device 100 including the radio wave sensor 1 and the signal processing device 2.

The radio wave sensor 1 of the embodiment is a Doppler sensor configured to transmit a radio wave having a predetermined frequency to a detection area, to receive the radio wave reflected by an object moving in the detection area, and to output a sensor signal having a Doppler frequency which is equivalent to a difference between the transmitted and received radio waves. The sensor signal Sa output from the radio wave sensor 1 is therefore a time-domain analog signal representing the movement of the object.

Figure 10:
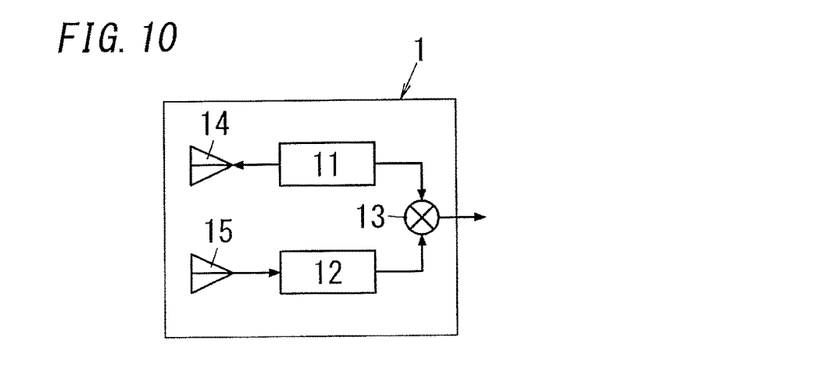
FIG. 10 is a block diagram of the radio wave sensor in the embodiment.

As shown in FIG. 10, the radio wave sensor 1 includes a transmitter 11, a receiver 12 and a mixer 13. The transmitter 11 is configured to transmit a radio wave to the detection area. The receiver 12 is configured to receive the radio wave reflected by an object in the detection area. The mixer 13 is configured to output a sensor signal having a Doppler frequency which is equivalent to a difference between the radio wave transmitted from the transmitter 11 and the radio wave received by the receiver 12. The transmitter 11 includes an antenna 14 for transmission. The receiver 12 includes an antenna 15 for reception. The transmitter 11 may be configured to transmit a millimeter-wave having a frequency of 24. 15 [GHz] as the radio wave. The radio wave transmitted from the transmitter 11 is not limited to the millimeter-wave, but may be a microwave. Also, the frequency of the radio wave transmitted from the transmitter 11 is not limited particularly. If the radio wave is reflected by an object moving in the detection area, the frequency of the reflected wave should be shifted by the Doppler effect.

As shown in FIG. 1, the signal processing device 2 includes an amplifier 3, an A/D converter 4, a signal processor 5 and an outputter 6.

The amplifier 3 is an amplifier including an operational amplifier, for example. The amplifier 3 is configured to amplify the analog sensor signal Sa supplied from the radio wave sensor 1 and to output the amplified signal to the A/D converter 4.

The A/D converter 4 is configured to convert the sensor signal Sb amplified by the amplifier 3 into a digital sensor signal Sc and to output the resultant digital signal.

The signal processor 5 has a function configured to apply Discrete Cosine Transform (DCT) to the digital sensor signal Sc output from the A/D converter 4 to convert the digital sensor signal into a frequency domain signal.

The signal processor 5 is configured to convert the time-domain sensor signal Sc (on the time axis) into a frequency-domain sensor signal Sx (on the frequency axis) by DCT, and to perform recognition processing of identifying an object based on a frequency distribution of the frequency-domain signal. The signal processor 5 has a function of an adaptive filter shown in FIG. 2, and performs filtering processing of removing a background signal such as unknown noises and undesired signals in the frequency domain before the recognition processing.

Figure 11:
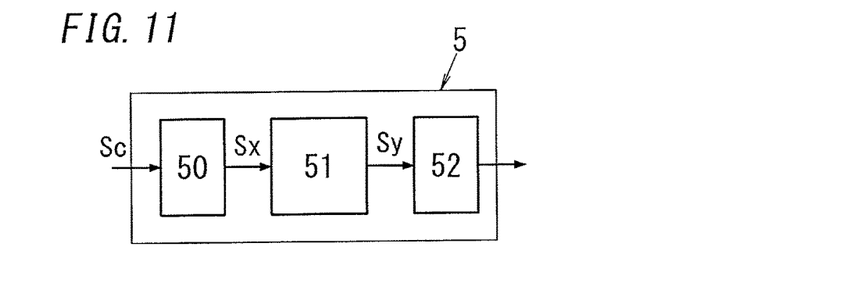
FIG. 11 is a block diagram of the signal processor in the embodiment.

Specifically, the signal processor 5 includes, as shown in FIG. 11, a DCT converter 50, a filtering unit 51 and an identification processor 52. The DCT converter 50 is configured to apply Discrete Cosine Transform to the supplied time-domain sensor signal Sc to convert the signal into the frequency domain sensor signal Sx, and to output the resultant signal. The filtering unit 51 is configured to adaptively-estimate the background signal based on the frequency-domain sensor signal Sx from the DCT converter 50 and a reference signal Sd which is a white noise, and to remove the background signal from the frequency-domain sensor signal Sx from the DCT converter 50. The identification processor 52 is configured to identify the object as a detection target based on an output signal Sy from the filtering unit 51.

The adaptive filter includes a filter having a transfer function (filter coefficient) and self-adjusts the transfer function according to an adaptive algorithm (optimization algorithm), and can be of a digital filter. In the embodiment, an adaptive filter using Discrete Cosine Transform is used. In this case, the adaptive algorithm of the adaptive filter can be a DCT-LMS (Least Mean Square) algorithm.

In the same sample number, a frequency-domain adaptive filter using DCT has twice the frequency resolution of a frequency-domain adaptive filter using FFT. Therefore, the adaptive filter using DCT can achieve removing noises in a narrowband with a compact processing system having a smaller hardware resource such as memory.

For example, in a case of converting, using FFT, a time-domain digital signal of which sampling period is "t" and of which sample number is "2N" into a frequency-domain signal, under a condition that the maximum frequency of a frequency range is "1/(2t) [Hz]", the frequency resolution be "1/(2 Nt) [Hz]" and the number of valid samples be "N". Therefore, an adaptive filter using FFT requires a memory having at least "2N" words, in order to apply FFT. Further, because of requiring performing complex number calculation, this filter requires a comparatively large-scale hardware.

On the other hand, in a case of converting, using DCT, a time-domain digital signal of which sampling period is "t" and of which sampling number is "N" into a frequency-domain signal, the achievable frequency resolution can be "1/(2 Nt) [Hz]" and the number of valid samples can be "N". The maximum frequency of this adaptive filter using DCT is "1/(2t) [Hz]", which is the same as the maximum frequency of the frequency domain adaptive filter using FFT. In other words, DCT processing achieved with a memory having "N" words can realize the comparable frequency resolution to FFT processing which requires a memory having at least "2N" words.

The adaptive filter using DCT is a processing method performed based on the real number. On the other hand, the adaptive filter using FFT is a processing method requiring complex number calculation. Therefore, amount of calculation of the adaptive filter using DCT can be small compared to the adaptive filter using FFT.

Moreover, a predetermined processing using window function should be applied before FFT, in order to remove filter-side-lobes existing outside a desired pass-band. On the other hand, DCT does not require the application of the window function. Alternatively, the window function can be achieved with a simple filter.

Accordingly, the adaptive filter using DCT can be achieved with a simplified hardware configuration in comparison with the adaptive filter using FFT.

Consequently, because the signal processing device 2 includes the frequency domain adaptive filter using DCT, it is possible to remove a background signal which is hard to forecast (e.g., undesired signals or ambient noise depending on the installation site of the device) with a comparatively simple hardware configuration achieved by a low cost. Moreover, it is possible to efficiently obtain only the desired signal because the device includes the frequency-domain adaptive filter using DCT.

It is generally known that, for achieving a desired filtering performance, frequency-domain adaptive filters have a superior converging property compared to time-domain adaptive filters. Among them, the LMS algorithm requires a smaller amount of calculation compared to Recursive Least Square (RLS) algorithm.

Figure 2:
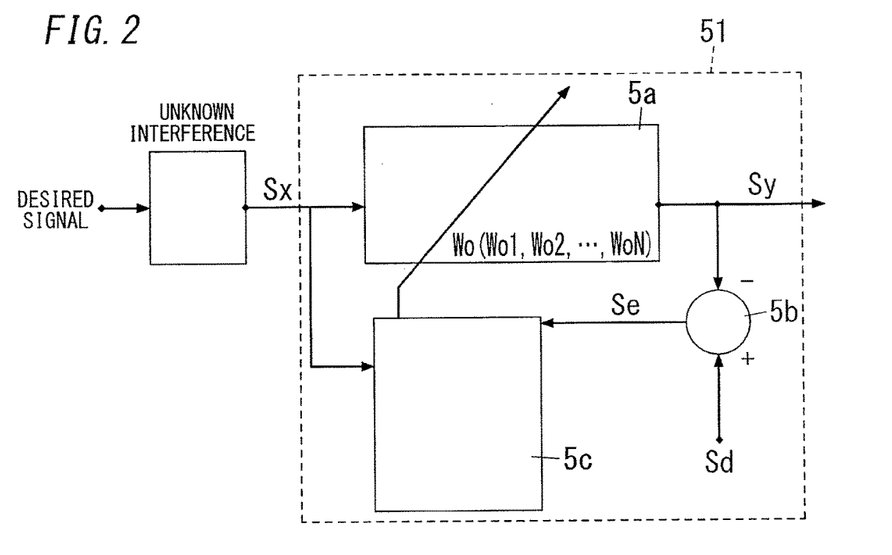
FIG. 2 is a diagram for illustrating functions of an adaptive filter in the embodiment.

The signal processor 5 includes the filtering unit 51 as an adaptive filter. As shown in FIG. 2, the filtering unit 51 includes a filter 5a, a subtracter 5b and an adaptive processor 5c.

The signal processor 5 is configured to convert the time-domain digital sensor signal Sc (a signal which includes a desired signal and unknown background signal) supplied from the A/D converter 4 into the frequency domain sensor signal Sx by the DCT converter 50. The filter 5a is configured to receive the sensor signal Sx, to filter out the undesired background signal from the sensor signal Sx based on a determined filter coefficient Wo (which is variable) to produce an output signal Sy. The subtracter 5b is configured to calculate difference between the output signal Sy of the filter 5a and a reference signal Sd to obtain an error signal Se. In the embodiment, the reference signal Sd is a white noise, and may be a noise generating inside the signal processing device 2 (such as internal noise of a reception circuit) for example. The adaptive processor 5c is configured to estimate frequency components of the background signal based on the error signal Se in accordance with DCT-LMS algorithm, to produce correction factors of the filter coefficient according to the estimated frequency components of the background signal, and to update the filter coefficient Wo. The white noise used as the reference noise Sd may be, although not limited, ideally a frequency-independent white noise, or may be a noise signal of which intensity is almost the same in a wide frequency region.

Figure 3:
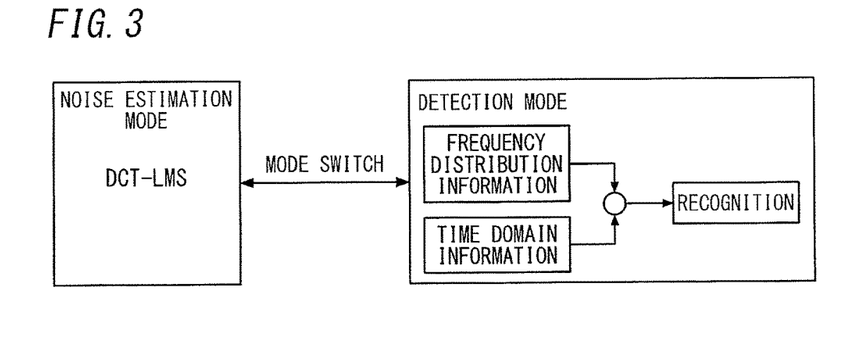
FIG. 3 is a diagram for illustrating operation modes of a signal processor in the embodiment.
Figure 4:
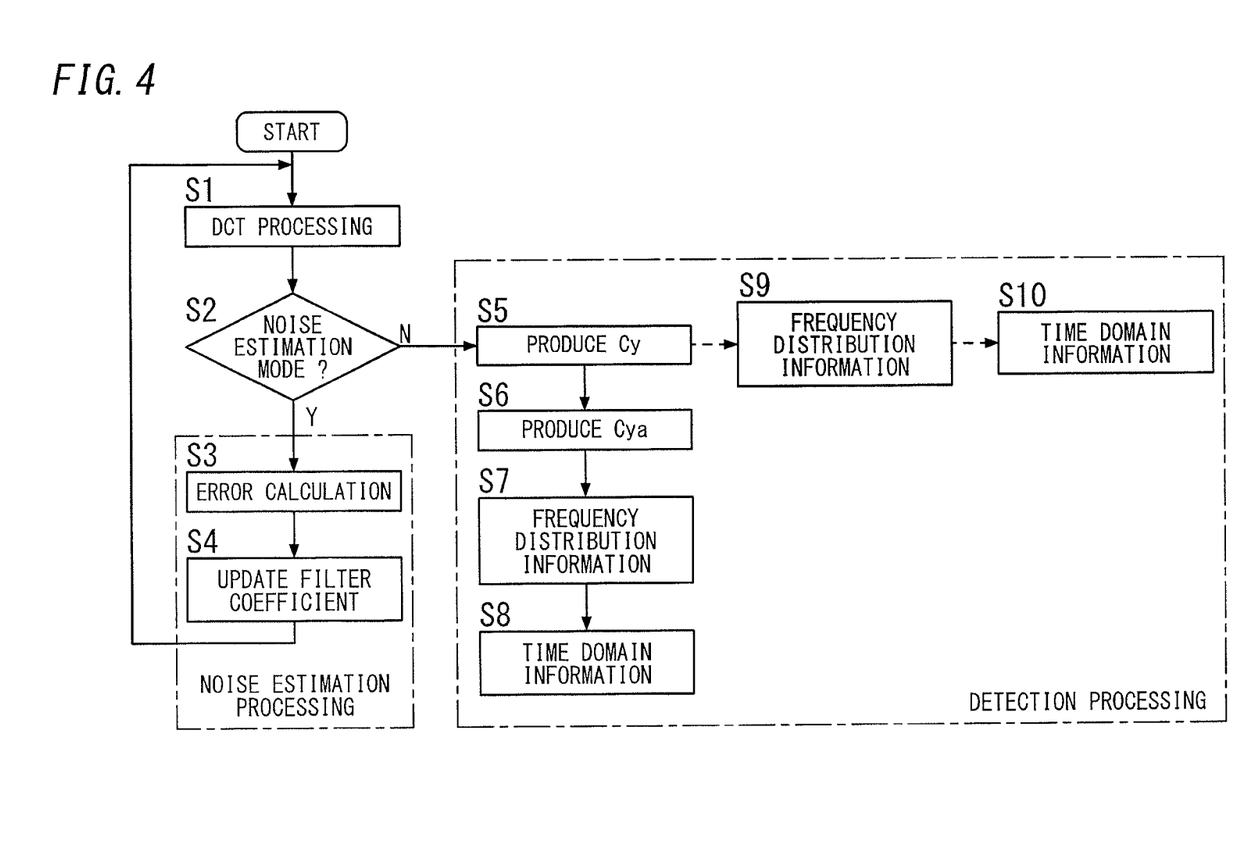
FIG. 4 is a flow chart illustrating an operation of the signal processor in the embodiment.

The signal processor 5 includes the above-described adaptive filter, and is configured, as shown in FIG. 3, to be switchable between a noise estimation mode (first mode) and a detection mode (second mode) as operation modes. The noise estimation mode and the detection mode will be described with reference to FIG. 4.

The signal processor 5 converts a sensor signal Sc output from the A/D converter 4 into a frequency-domain sensor signal Sx by DCT (S1). The signal processor 5 extracts, from the frequency-domain sensor signal Sx, signal components with respect to frequency bins fb having mutually different frequency bandwidths (see FIG. 5A). Intensity amplitudes of respective frequency bins fb are used as DCT coefficients.

The signal processor 5 judges a current operation mode (S2). In a case that the current operation mode is the noise estimation mode, the signal processor 5 performs the processing described below. It will be assumed that the sensor signal Sx includes only the background signal in the noise estimation mode (in other words, the signal processor 5 of the embodiment is allowed to be set to the noise estimation mode only when determining that the detection target object is not present).

In the noise estimation mode, the adaptive processor 5c receives an error signal Se which is the difference between the output signal Sy of the filter 5a and the reference signal Sd (S3). The adaptive processor 5c performs the frequency-domain adaptive processing using DCT so that the error signal Se becomes the minimum, and updates the filter coefficient Wo (S4). Then, it returns to the step S1.

The signal processor 5 operating in the noise estimation mode repeats the above-described operation according to the steps S1 to S4, and the adaptive processor 5c stops the updating processing of the filter coefficient Wo upon the error signal Se converging within a predetermined range. In the embodiment, a filter coefficient Won (where "n" is any of the numeral "1" to "N" and "N" is the total number of frequency bins fb) is set for each filter bin fb. The filter 5a removes the components of the background signal from the signal components of the respective frequency bins fb, based on the filter coefficients Wo (Wo1, Wo2, . . . , WoN).

The filter coefficients Wo may be updated: based on each of sampling points (based on each frequency bin fb); based on each of blocks each of which includes sampling points (based on each block including frequency bins fb); or based on each of blocks including data (frequency bin fb) which may overlap among blocks, and one of these updating processing may be selected in view of the required convergence and accuracy.

After the error signal Se has converged within the predetermined range and the signal processor 5 stops the updating processing of the filter coefficients Wo, the signal processor 5 switches the operation mode thereof from the noise estimation mode to the detection mode.

Note that the adaptive processor 5c may be configured, when determining that the error signal Se has converged within a predetermined range while operating in the noise estimation mode, to produce filter coefficients Wo based on respective error signals Se which are each within the predetermined range and are obtained at different time points. In this structure, the adaptive processor 5c applies averaging processing such as signal averaging or median averaging, exception value removing processing of discarding exception values, dispersion condition detection processing, and the like, to the filter coefficients Wo produced based on respective error signals Se which are each within the predetermined range and are obtained at different time points, and to set the applied result to the filter coefficient Wo of the filter 5a.

In a case that the current operation mode is the detection mode in the step S2, the signal processor 5 performs the processing described below.

The signal processor 5 operating in the detection mode produces intensity amplitude Cy (equivalent to the output signal Sy, and more specifically to components of the output signal Sy for respective frequency bins fb) of the background signal-removed sensor signal, using the DCT coefficients Cx (equivalent to the sensor signal Sx, and more specifically to components of the sensor signal Sx for respective frequency bins fb) obtained by applying DCT to the sensor signal Sc output from the A/D converter 4, and filter coefficients Wo of the filter 5a (S5). Specifically, the intensity amplitude Cy(n) of the "n"th frequency bin fb (where "n" is any of the numeral "1" to "N" and "N" is the total number of frequency bins fb) is obtained by the equation Cy(n)=Cx(n)*Won, where Cx(n) represents the DCT coefficient of the "n"th frequency bin.

Figure 5A:
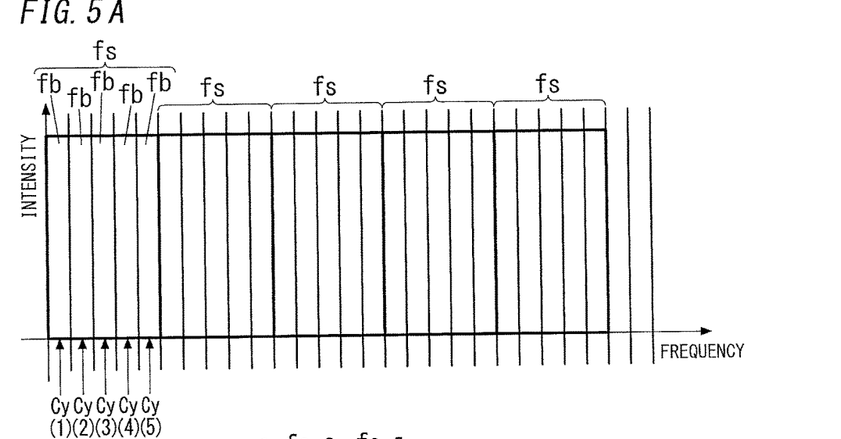
FIGS. 5A to 5C are diagrams for illustrating frequency domain in the embodiment.

The signal processor 5 generates, in the frequency domain, one or more sub-bands fs each of which includes two or more adjacent frequency bins fb (see FIG. 5A). The signal processor 5 applies averaging processing such as signal averaging, weighted signal averaging or median averaging, exception value removing processing of discarding exception values, dispersion condition detection processing, and the like, for each sub-band fs using intensity amplitudes Cy of respective frequency bins fb of the sub-band fs, to produce a representative value Cya (hereinafter, referred to as "representative intensity value Cya") of intensity amplitude Cy for each sub-band fs (S6).

Figure 5B:
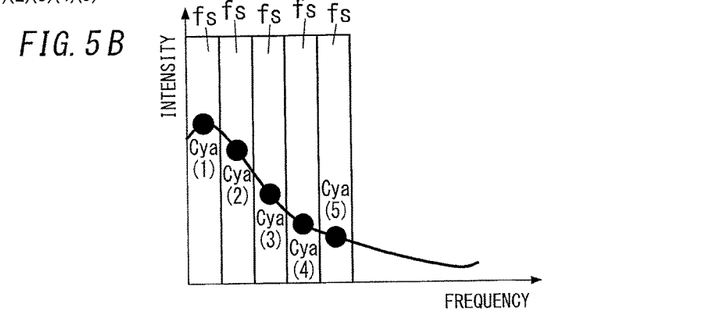

For example, it will be assumed a case that the signal processor 5 is configured to produce the representative intensity value Cya using the signal averaging. It will be assumed that, as shown in FIG. 5A, the respective intensity amplitudes Cy regarding five frequency bins fb of a lowest frequency sub-band fs are represented by "Cy(1)", "Cy(2)", "Cy(3)", "Cy(4)", and "Cy(5)", respectively, at a certain time point. In this case, the representative intensity value Cya(1) (see FIG. 5B), which is produced by the signal averaging, of this lowest sub-band fs is represented by the following equation:

$$Cya(1)=(Cy(1)+Cy(2)+Cy(3)+Cy(4)+Cy(5))/5.$$

The signal components (representative intensity values) of the second lowest sub-band fs, the third lowest sub-band fs, the fourth lowest sub-band fs, and the fifth lowest sub-band fs, which are respectively represented by "Cya(2)", "Cya(3)", "Cya(4)" and "Cya(5)" as shown in FIG. 5B, are produced as the similar manner.

With this manner, the signal processor 5 can obtain information (frequency distribution information) on the frequency distribution depending on the representative intensity values Cya regarding respective sub-bands fs.

Possibly, the signal processor 5 applies Inverse Discrete Cosine Transform (IDCT) to the representative intensity values Cya of the respective sub-bands fs to obtain inversion values, in order to produce a background signal-removed time-domain sensor signal (i.e., time-domain information) (S8).

Then, the signal processor 5 performs recognition processing of identifying a detection target object based on the frequency distribution information produced from the representative intensity values Cya of the respective sub-bands fs (and the time-domain information). In the present disclosure, the "identification" may include "classification" and/or "recognition". In the embodiment, since the representative intensity values Cya (each of which is a representative value of intensity amplitudes Cy of the frequency bins fb) of the respective sub-bands fs are used, it is possible to suppress the influence of unexpected noise and the like.

Possibly, the signal processor 5 acquires information (frequency distribution information) on frequency distribution depending on the intensity amplitudes Cy of the respective frequency bins fb, which have been produced in the step S5 (S9).

In this case, possibly, the signal processor 5 applies Inverse Discrete Cosine Transform (IDCT) to the filter coefficients Wo (Wo1, Wo2, . . . , WoN) set to the respective frequency bins fb to obtain inversion values, and multiplies the sensor signal Sc output from the A/D converter 4 by the produced inversion values (in other words, applies Inversion Discrete Cosine Transform (DCT) to the intensity amplitudes Cy of the respective frequency bins fb), in order to produce a background signal-removed time-domain sensor signal (i.e., time-domain information) (S10). Inversion Discrete Cosine Transform may be applied to all of the filter coefficients set to the respective frequency bins, or of the filter coefficients set to predetermined part of the frequency bins.

In this case, the signal processor 5 (the identification processor 52) performs the recognition processing of identifying a detection target object based on the frequency distribution information produced from the intensity amplitudes Cy of the respective frequency bins fb, and/or the time-domain information produced from the filter coefficients Wo (Wo1, Wo2, . . . , WoN) set to the respective frequency bins fb.

In the recognition processing, the signal processor 5 (the identification processor 52) may compare intensity of the output signal Sy at a predetermined frequency with a threshold to determine the presence or absence of an object, for example. Alternatively or additionally, it may use another algorithms such as pattern recognition processing based on principal component analysis, pattern recognition processing based on KL conversion, recognition processing based on the intensity amplitude component ratio obtained by multi-regression analysis, and recognition processing based on neural network, in order to identify the type of the detection target object.

Since DCT is the real number arithmetic, phase information of the sensor signal would be lost. In the field of the sensor device 100, the phase information is used for determining "distance" in some cases. It should be noted that, in a case that the radio wave sensor 1 is a Doppler sensor, it is possible to roughly estimate the distance based on the background signal-removed time-domain sensor signal. Therefore, if there need not simultaneous determination of the movement and the distance in strict sense, the distance information, as supplemental information, can be produced from the time-domain sensor signal produced in the step S8 or S10 without increasing the hardware-scale. Consequently, the signal processor 5 may be configured to obtain the distance information to the detection target object based on the time-domain sensor signal produced in the step S8 or S10, and to use this distance information together with the frequency distribution information or the time-domain information, when performing the recognition processing of identifying the detection target object.

The signal processing device 2 includes the outputter 6 configured to output the identification result by the signal processor 5. If the detection target object is identified by the signal processor 5, the outputter 6 outputs an output signal showing "1" representing detection of an object. On the other hand, if the detection target object is not identified by the signal processor 5, the outputter 6 outputs an output signal showing "0" representing non-detection of an object.

Figure 6:
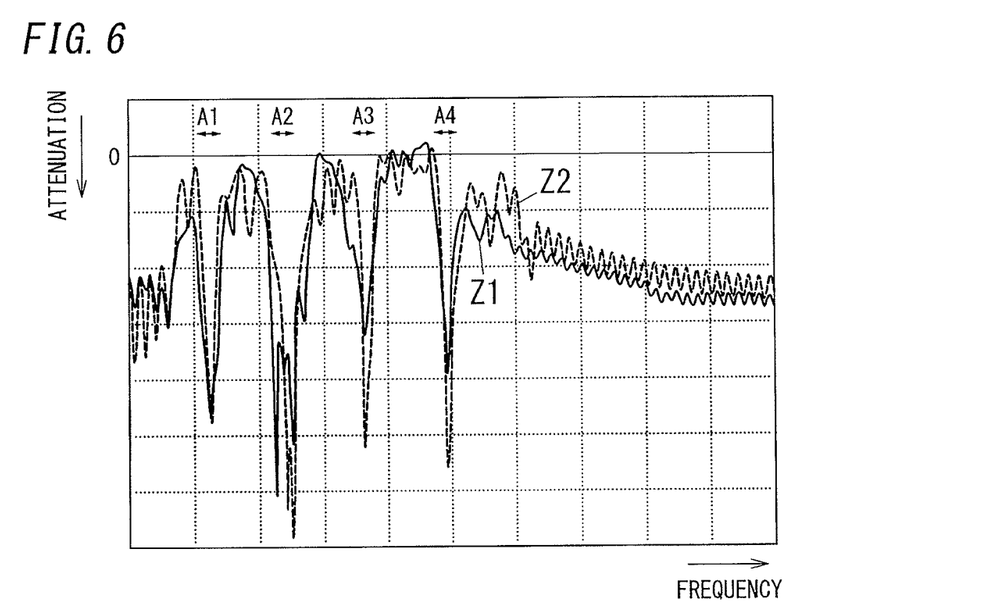
FIG. 6 is a graph illustrating transfer characteristics of adaptive filters using DCT- and FFT-LMS algorithms.

A transfer characteristics Z1 of the filter 5a whose filter coefficients Wo are determined based on the above described DCT-LMS algorithm is illustrated in FIG. 6. This graph indicates that there has been estimated a presence of a background signal having noise components at some frequency bandwidths A1 to A4, and that filtering characteristics have successfully created and reduced the signal components at the noise-present frequency bandwidths and allowed transmission at other frequency region. A transfer characteristics Z2 regarding filter coefficients determined based on FFT-LMS algorithm is also illustrated as a comparative example in FIG. 6. According to these examples, the filtering performance of a filter obtained through DCT-LMS algorithm is not so deteriorated compared to that based on FFT-LMS algorithm, despite the DCT can be achieved with a smaller calculation amount compared to FFT.

Figure 7A:
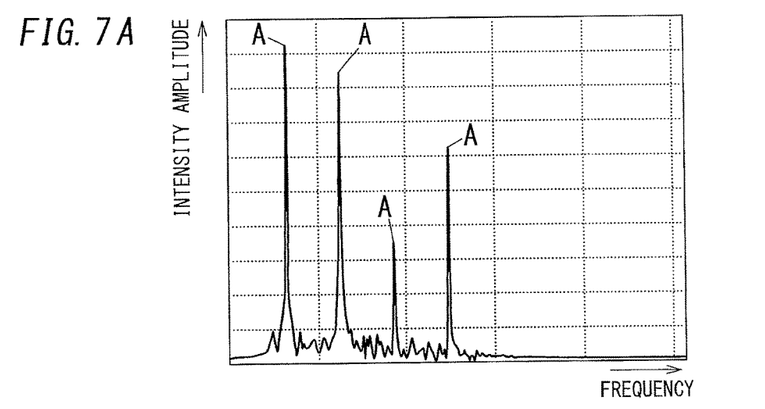
FIGS. 7A to 7C are waveform diagrams illustrating signal processing, in frequency domain, in the embodiment.
Figure 7B:
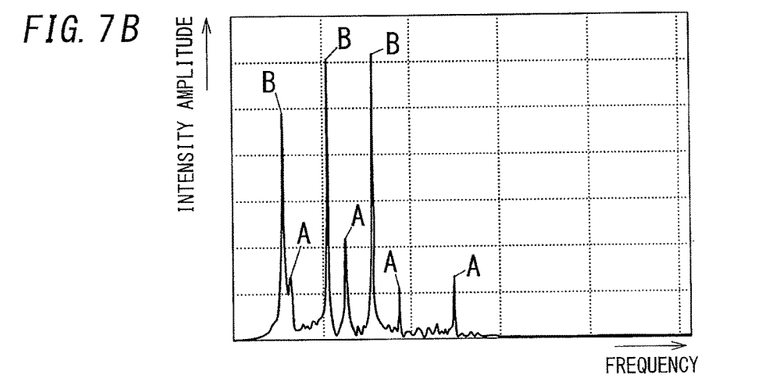
Figure 7C:
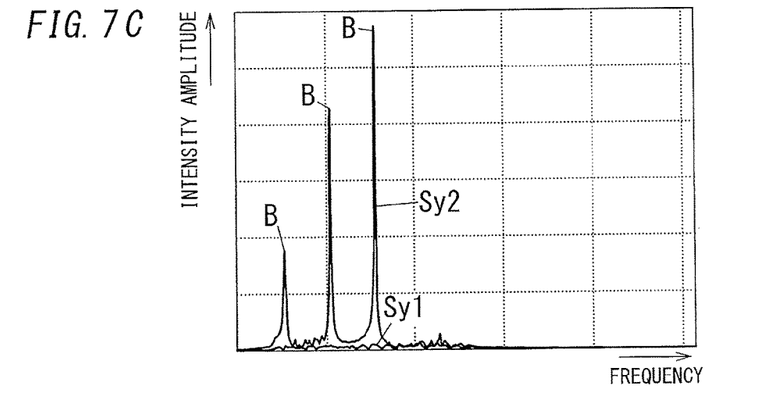

FIGS. 7A to 7C illustrate a flow of the above signal processing. FIG. 7A shows a frequency distribution of a sensor signal Sx including a background signal only, where "A" represents frequency components of the background signal. FIG. 7B shows a frequency distribution of a sensor signal Sx including a background signal and a desired signal (a signal derived from a detection target object), where "A" represents frequency components of the background signal and "B" represents frequency components of the desired signal.

FIG. 7C shows an output signal Sy1 of the filter 5a in a case where the signal processor 5 operates in the detection mode and the sensor signal Sx of FIG. 7A (the sensor signal including the background signal only) is supplied to the device, and an output signal Sy2 of the filter 5a in a case where the signal processor 5 operates in the detection mode and the sensor signal Sx of FIG. 7B (the sensor signal including the background signal and the desired signal) is supplied to the device. The frequency components "A" of the background signal are removed from the output signal Sy1, by the updating of the filter coefficients Wo of the filter 5a based on DCT-LMS algorithm. Also, the frequency components "A" of the background signal are removed from the output signal Sy2 whereas the frequency components "B" of the desired signal remain in the signal, because the filter coefficients Wo of the filter 5a are determined adequately.

Figure 8:
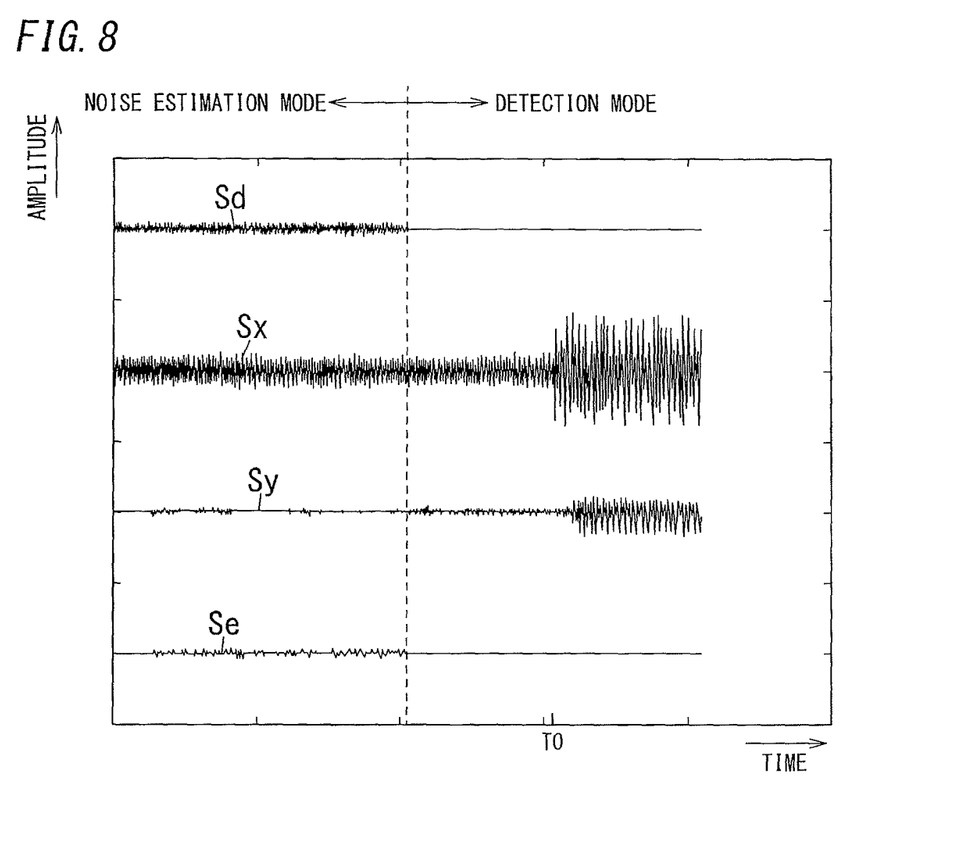
FIG. 8 is a waveform diagram illustrating signal processing, in time domain, in the embodiment.

FIG. 8 shows temporal waveforms of the reference signal Sd, the sensor signal Sx, the output signal Sy and the error signal Se where the device switches from the noise estimation mode to the detection mode. FIG. 8 shows a case where no detection target object exists in the detection area before the time point T0, and an object enter the detection area at the time point T0. The reference signal Sd is output in the noise estimation mode, and is stopped in the detection mode. The sensor signal Sx includes only the background signal before the time point T0, and, after the time point T0, includes the desired signal derived from the detection of the detection target object in addition to the background signal. Regarding the output signal Sy, the background signal is successfully removed therefrom in both the noise estimation mode and the detection mode, and it includes only the desired signal after the time point T0. The error signal Se is produced as difference between the output signal Sy and the reference signal Sd in the noise estimation mode, and is stopped to be output in the detection mode.

Figure 9A:
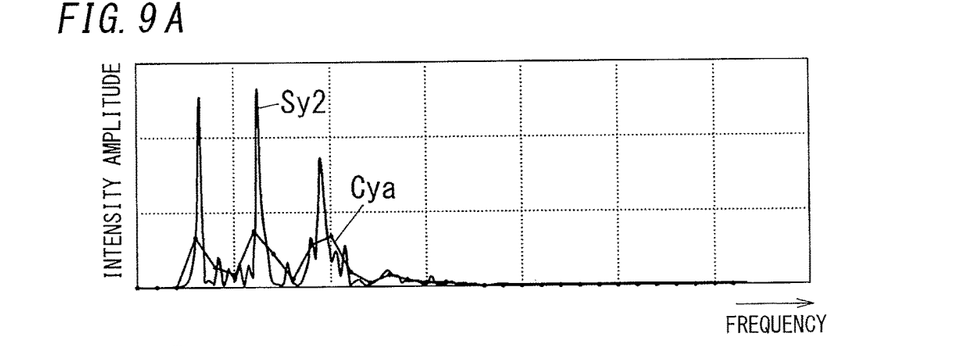
FIGS. 9A and 9B are waveform diagrams illustrating signal processing, in frequency domain, in the embodiment.
Figure 9B:
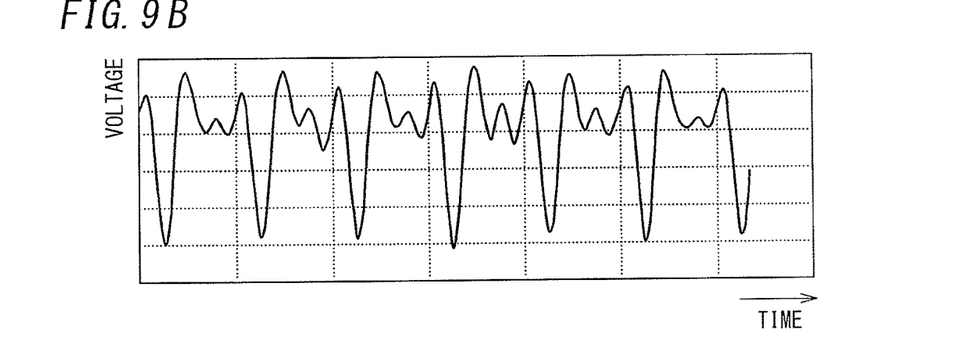

FIG. 9A shows a frequency distribution of the output signal Sy2 (namely, is a graph in which intensity amplitudes Cy of the respective frequency bins fb are plotted) output from the signal processor 5 operating in the detection mode under presence of a detection target object. FIG. 9A also shows the frequency-domain representative intensity values Cya of the respective sub-bands fs produced from the output signal Sy2 of the signal processor 5 (see "Cya" in FIG. 9A). The representative intensity value Cya is produced for each sub-band fs by applying weighted signal averaging to the intensity amplitudes Cy of the respective frequency bins fb of the sub-band. Inverse Discrete Cosine Transform is applied to the representative intensity values Cya shown in FIG. 9A to produce inversion values, and thereby the background signal-removed time-domain sensor signal (time-domain information) as shown in FIG. 9B is obtained.

According to the signal processor 5, the estimation accuracy thereof can be improved by performing the adaptive processing multiple times to determine the filter coefficient Wo in a region in which the error in the estimation accuracy of the adaptive filter is comparatively small, in the noise estimation mode. Further, according to the signal processor 5, in the detection mode, it is possible to improve the signal-to-noise ratio of the signal in a focused desired bandwidth, by the sub-banding processing of the signal in the frequency domain or averaging processing in the sub-band, with a simple hardware configuration.

The signal processor 5 is configured to be allowed or forbidden to switch the operation mode according to the result of the recognition processing. The signal processor 5 is configured, if a detection target object is identified by the recognition processing, to be forbidden to switch from the detection mode to the noise estimation mode. The signal processor 5 is configured, if a detection target object is not identified by the recognition processing, to be allowed to switch from the detection mode to the noise estimation mode. In other words, the signal processor 5 is allowed to switch from the detection mode to the noise estimation mode only in a case where the sensor signal Sx includes only a background signal but does not include a desired signal. Therefore, the filter coefficient Wo determined in the noise estimation mode can be a value capable of successfully removing the background signal and obtaining the desired signal with an improved accuracy.

The signal processor 5 may be configured to produce representative intensity values Cya of the respective sub-bands fs of the sensor signal from which the background signal has been removed, and then to produce normalized representative intensity values from the representative intensity values, and to produce the frequency distribution information, the time-domain information and the like, based on the normalized representative intensity values of the respective sub-bands fs. The "normalized representative intensity value" is obtained by, using the total sum of the representative intensity values Cya of predetermined sub-bands fs used for the recognition processing by the signal processor 5, normalizing the representative intensity value Cya of each sub-band fs.

Figure 5C:
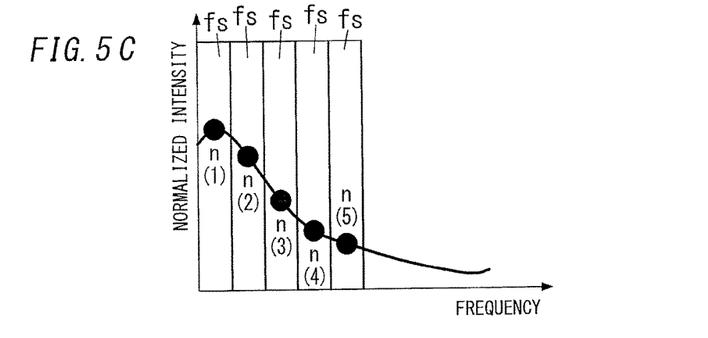

For example, in a case that the total number of the sub-bands fs is 16, but the predetermined sub-bands fs used for the recognition processing are only five sub-bands which are the first to fifth lowest frequency sub-bands. A normalized representative intensity value of a first frequency sub-band fs at a certain time point, which is represented by "n(1)" (see FIG. 5C), is calculated by the signal processor 5 according to the following equation:

$$n(1)=Cya(1)/(Cya(1)+Cya(2)+Cya(3)+Cya(4)+Cya(5)). \quad (5)$$

The normalized representative intensity values n(2) to n(5) are produced as the similar manner.

The radio wave sensor 1 is used in the embodiment, but the sensor is not limited thereto, but may be other sensor as long as it receives a wireless signal such as radio wave or sonic wave reflected by an object.

The invention claimed is:

1. A signal processing device that is supplied with a sensor signal supplied from a sensor configured to receive a wireless signal reflected by an object and that identifies the object based on the sensor signal to output an identification result, the signal processing device comprising:
an amplifier configured to amplify the sensor signal;
an A/D converter configured to convert the sensor signal amplified by the amplifier into a digital sensor signal and to output the digital sensor signal; and
a signal processor configured
to convert the digital sensor signal output from the A/D converter into a frequency domain sensor signal by Discrete Cosine Transform processing, and
to operate as an adaptive filter for removing a background signal from the frequency domain sensor signal in the frequency domain based on a filter coefficient,
the signal processor being configured
to obtain an error signal which is a difference between an output signal of the adaptive filter and a reference signal which is white noise with the output signal as the background signal when the object is not present,
to determine the filter coefficient so that the error signal converges within a predetermined range, and
to perform recognition processing of identifying the object based on a result of the adaptive filter removing the background signal from the frequency domain sensor signal in the frequency domain based on the filter coefficient.

2. The signal processing device according to claim 1, wherein
the signal processor has selectively switchable first and second modes,
the signal processor is configured,
in the first mode, to update the filter coefficient so that the error signal converges within the predetermined range when the object is not present, and
in the second mode, to stop the updating processing of the filter coefficient, and to remove the background signal from the frequency domain sensor signal in the frequency domain.

3. The signal processing device according to claim 2, wherein the signal processor is configured, when determining that the error signal has converged while operating in the first mode, to switch from the first mode to the second mode.

4. The signal processing device according to claim 2, wherein the signal processor is configured, when determining that the error signal has converged within the predetermined range while operating in the first mode,
to produce filter coefficients based on respective error signals which are each within the predetermined range and are obtained at different time points,
to calculate an average of the produced filter coefficients, and
to set the calculated average to the filter coefficient.

5. The signal processing device according to claim 2, wherein the signal processor is configured, in the second mode,
to convert the digital sensor signal output from the A/D converter into the frequency domain sensor signal by the Discrete Cosine Transform processing,
to remove the background signal from the frequency domain sensor signal in the frequency domain by supplying the frequency domain sensor signal to the adaptive filter having the filter coefficient determined by the first mode,
to extract therefrom signal components with respect to frequency bins, the frequency bins having mutually different frequency bandwidths, and
to perform recognition processing of identifying the object based on the signal components of the respective frequency bins.

6. The signal processing device according to claim 5, wherein
a filter coefficient is determined for each of the frequency bins, the signal processor is configured
- to apply Inverse Discrete Cosine Transform processing to all or predetermined part of the filter coefficients to obtain inversion values,
- to produce time-domain data from the digital sensor signal output from the A/D converter and the obtained inversion values, and
- to perform the recognition processing of identifying the object based on the produced time-domain data.

7. The signal processing device according to claim 5, wherein the signal processor is configured to further use distance information from the sensor to the object, when performing the recognition processing of identifying the object.

8. The signal processing device according to claim 5, wherein the signal processor is configured to,
- if the object is identified by the recognition processing, be forbidden to switch from the second mode to the first mode, and
- if the object is not identified by the recognition processing, be allowed to switch from the second mode to the first mode.

9. The signal processing device according to claim 2, wherein the signal processor is configured, in the second mode,
- to convert the digital sensor signal output from the A/D converter into the frequency-domain sensor signal by the Discrete Cosine Transform processing,
- to remove the background signal from the frequency domain sensor signal in the frequency domain by supplying the frequency domain sensor signal to the adaptive filter having the filter coefficient determined by the first mode,
- to extract therefrom signal components with respect to sub-bands each of which includes frequency bins, the frequency bins having mutually different frequency bandwidths, and
- to perform recognition processing of identifying the object based on the signal components of the respective sub-bands.

10. The signal processing device according to claim 9, wherein the signal processor is configured
- to apply Inverse Discrete Cosine Transform processing to the signal components of the respective sub-bands to obtain inversion values,
- to produce time-domain data from the obtained inversion values, and
- to perform the recognition processing of identifying the object based on the produced time-domain data.

11. The signal processing device according to claim 1, wherein an adaptive algorithm for the adaptive filter is an LMS algorithm of the Discrete Cosine Transform.

12. The signal processing device according to claim 1, wherein the signal processor comprises:
- a DCT converter configured to convert the digital sensor signal supplied from the A/D converter into the frequency-domain sensor signal by the Discrete Cosine Transform processing;
- a filtering unit configured to adaptively-determine the filter coefficient based on the frequency-domain sensor signal from the DCT converter and the reference signal, and to remove the background signal from the frequency-domain sensor signal from the DCT converter;
- and an identification processor configured to identify the object based on an output signal from the filtering unit.

13. The signal processing device according to claim 12, wherein the filtering unit comprises:
- a filter configured to remove the background signal from the frequency domain sensor signal in the frequency domain based on a variable filter coefficient to produce the output signal;
- a subtracter configured to calculate difference between the output signal from the filter and the reference signal to obtain the error signal;
- and an adaptive processor configured to determine the filter coefficient so that the error signal converges within the predetermined range.

* * * * *